US009453919B2

(12) United States Patent
Bouvier Des Noes

(10) Patent No.: US 9,453,919 B2
(45) Date of Patent: Sep. 27, 2016

(54) METHOD FOR ACQUIRING A GOLD SEQUENCE BY DOUBLE ITERATIVE DECODING

(71) Applicant: Commissariat A L'Energie Atomique et aux Energies Alternatives, Paris (FR)

(72) Inventor: Mathieu Bouvier Des Noes, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/836,122

(22) Filed: Aug. 26, 2015

(65) Prior Publication Data

US 2016/0061961 A1    Mar. 3, 2016

(30) Foreign Application Priority Data

Aug. 29, 2014   (FR) ...................................... 14 58115

(51) Int. Cl.
*H04B 1/00*      (2006.01)
*G01S 19/24*     (2010.01)
(Continued)

(52) U.S. Cl.
CPC ................ *G01S 19/24* (2013.01); *G01S 19/30* (2013.01); *H04B 1/69* (2013.01); *H04B 1/7075* (2013.01); *H04B 7/15* (2013.01); *H04B 2201/70715* (2013.01)

(58) Field of Classification Search
CPC .............................. H04B 1/707; H04B 1/7117
USPC ......................................... 375/147, 130, 140
See application file for complete search history.

(56) References Cited

U.S. PATENT DOCUMENTS

2005/0084112 A1*   4/2005   Kim .......................... H03K 3/84
                                                                       380/268

2008/0215269 A1    9/2008   Chugg et al.
(Continued)

FOREIGN PATENT DOCUMENTS

CN          102332932 B      1/2014
FR          3 002 388 A1      8/2014

OTHER PUBLICATIONS

French Preliminary Search Report issued May 19, 2015 in French Application 14 58115, filed on Aug. 29, 2014 ( with English Translation of Categories of Cited Documents).

Andreas Polydoros et al. "A Unified Approach to Serial Search Spread-Spectrum Code Acquisition—Part I: General Theory, Part II: A Matched-Filter Receiver", IEEE Transactions on Communications, vol. Com-32, No. 5, 1984, 18 pages.

(Continued)

*Primary Examiner* — Helene Tayong

(74) *Attorney, Agent, or Firm* — Oblon, McClelland, Maier & Neustadt, L.L.P.

(57) ABSTRACT

A method for acquiring a Gold code, obtained as a sum of a first M-sequence (x) and a second M-sequence ($y_i$), the first M-sequence being generated by a first generator polynomial ($g_x$) and the second M-sequence being generated by a second generator polynomial ($g_y$), the weight of the first generator polynomial being lower than the weight of the second generator polynomial, the acquiring method involving a first step of message passing decoding according to a first bipartite graph the edges of which are determined by the coefficients of the first generator polynomial, a decimation step using a predetermined decimation factor, and a second step of message passing decoding according to a second bipartite graph the edges of which are determined by a third generator polynomial having a minimum weight generating a third M-sequence having the same length as that of the second M-sequence.

6 Claims, 6 Drawing Sheets

(51) Int. Cl.
  *G01S 19/30*   (2010.01)
  *H04B 1/69*    (2011.01)
  *H04B 7/15*    (2006.01)
  *H04B 1/7075*  (2011.01)

(56) References Cited

U.S. PATENT DOCUMENTS

2008/0224926 A1\* 9/2008 Curry ................ G01S 19/30
                                                    342/357.69
2010/0122143 A1\* 5/2010 Lee .................... H03M 13/1117
                                                    714/752
2014/0233610 A1  8/2014 Bouvier Des Noes et al.

OTHER PUBLICATIONS

Fabio Principe et al. "Rapid Acquisition of Gold Codes and Related Sequences Using Iterative Message Passing on Redundant Graphical Models", MILCOM 2006, XP055189450, 2006, 7 pages.

Wei Wang et al. "FPGA Implementation of Rapid PN Code Acquisition Using Iterative Message Passing Algorithms", IEEE Aerospace and Electronic Systems Magazine, vol. 29, No. 6, 2014, 11 pages.

Keith M. Chugg et al. "A New Approach to Rapid PN Code Acquisition Using Iterative Message Passing Techniques", IEEE Journal on Selected Areas in Communications, vol. 23, No. 5, 2005, 14 pages.

\* cited by examiner

| Satellite ID number | GPS PRN signal number | Code phase selection $G_2$ | Code delay chips | First 10 chips octal |
| --- | --- | --- | --- | --- |
| 1 | 1 | 2 ⊕ 6 | 5 | 1440 |
| 2 | 2 | 3 ⊕ 7 | 6 | 1620 |
| 3 | 3 | 4 ⊕ 8 | 7 | 1710 |
| 4 | 4 | 5 ⊕ 9 | 8 | 1744 |
| 5 | 5 | 1 ⊕ 9 | 17 | 1133 |
| 6 | 6 | 2 ⊕ 10 | 18 | 1455 |
| 7 | 7 | 1 ⊕ 8 | 139 | 1131 |
| 8 | 8 | 2 ⊕ 9 | 140 | 1454 |
| 9 | 9 | 3 ⊕ 10 | 141 | 1626 |
| 10 | 10 | 2 ⊕ 3 | 251 | 1504 |
| 11 | 11 | 3 ⊕ 4 | 252 | 1642 |
| 12 | 12 | 5 ⊕ 6 | 254 | 1750 |
| 13 | 13 | 6 ⊕ 7 | 255 | 1764 |
| 14 | 14 | 7 ⊕ 8 | 256 | 1772 |
| 15 | 15 | 8 ⊕ 9 | 257 | 1775 |
| 16 | 16 | 9 ⊕ 10 | 258 | 1776 |
| 17 | 17 | 1 ⊕ 4 | 469 | 1156 |
| 18 | 18 | 2 ⊕ 5 | 470 | 1467 |
| 19 | 19 | 3 ⊕ 6 | 471 | 1633 |
| 20 | 20 | 4 ⊕ 7 | 472 | 1715 |
| 21 | 21 | 5 ⊕ 8 | 473 | 1746 |
| 22 | 22 | 6 ⊕ 9 | 474 | 1763 |
| 23 | 23 | 1 ⊕ 3 | 509 | 1063 |
| 24 | 24 | 4 ⊕ 6 | 512 | 1706 |
| 25 | 25 | 5 ⊕ 7 | 513 | 1743 |
| 26 | 26 | 6 ⊕ 8 | 514 | 1761 |
| 27 | 27 | 7 ⊕ 9 | 515 | 1770 |
| 28 | 28 | 8 ⊕ 10 | 516 | 1774 |
| 29 | 29 | 1 ⊕ 6 | 859 | 1127 |
| 30 | 30 | 2 ⊕ 7 | 860 | 1453 |
| 31 | 31 | 3 ⊕ 8 | 861 | 1625 |
| 32 | 32 | 4 ⊕ 9 | 862 | 1712 |
| — | 33 | 5 ⊕ 10 | 863 | 1745 |
| — | 34 | 4 ⊕ 10 | 950 | 1713 |
| — | 35 | 1 ⊕ 7 | 947 | 1134 |
| — | 36 | 2 ⊕ 8 | 948 | 1456 |
| — | 37 | 4 ⊕ 10 | 950 | 1713 |

Fig. 2

METHOD FOR ACQUIRING A GOLD SEQUENCE BY DOUBLE ITERATIVE DECODING

TECHNICAL FIELD

The present invention generally relates to the decoding field. It is applicable in particular to the acquisition phase of a satellite signal by a GPS (Global Positioning System) receiver or by a receiver from the Galileo system.

STATE OF PRIOR ART

A GPS receiver conventionally determines its position by measuring the times of flight of signals received from a plurality of satellites (theoretically at least four of them). To assess the time of flight of a GPS signal emitted from a satellite, the receiver uses a so-called coarse acquisition channel (C/A channel) on which the satellite emits a navigation message spectrally spread by means of a pseudo-random sequence (called a spreading sequence) having good auto-correlation as well as inter-correlation properties (with the PRN sequences used by the other satellites).

The good auto-correlation properties of the spreading sequences enable a signal detection probability to be optimized in the presence of noise whereas the good inter-correlation properties of these sequences enable the different satellites to share a same transmission band by means of a code division multiple access (CDMA).

The first task of a GPS receiver is to detect the satellite in visibility. To do this, the receiver attempts to detect the spreading code of the satellite the presence of which it desires to test and, if applicable, is synchronised with respect to this signal. This first task is called a step of acquiring the GPS signal.

Numerous methods for acquiring the GPS signal are known from the state of the art. They relate to the multi-user detection issue in CDMA systems. These acquisition methods are generally based on a correlation of the signal received by the receiver with the spreading code of the satellite to be tested. An exemplary method of acquisition by correlation with the spreading code is described in the article by A. Polydoros et al. entitled "A unified approach to serial search spread spectrum code acquisition" Part I: A general theory & Part II: a matched filter receiver, published in IEEE Trans. on. Comm., Vol. 32, no. 5, 1984.

A more recent acquisition method has been described in the article of F. Principe et al. entitled "Rapid acquisition of Gold codes and related sequences using iterative message passing on redundant graphical models" published in Proc. MILCOM'06, 2006. This method is based on an iterative message passing decoding (IMPA) in a Tanner graph representing the parity requirements imposed to the code.

However, the latter acquisition method does not enable sufficiently low missed detection probability and false alarm probability levels to be obtained at a low signal-to-noise ratio (SNR). By missed detection probability, it is meant the probability not to be synchronized with a spreading sequence of a satellite whereas which is actually received by the receiver. By false alarm probability, it is meant the probability to be synchronized with a spreading sequence which is not received by the receiver.

Patent application FR 1351423 provides an acquisition method by an IMPA decoding enabling substantially lower missed detection probability and false alarm probability levels to be obtained. However, this method is relatively complex given that it carries out a series decoding. According to this method, indeed, the decoder is assumed to be synchronized with the code and attempts a first decoding. In case of failure, the decoder is assumed to be synchronized with the following moment and so on. Each decoding attempt has to be made in a very short time span so as to fulfil the acquisition time requirements.

The purpose of the present invention is to provide a method for acquiring a Gold sequence, in particular a Gold sequence emitted from a satellite or a GPS or Galileo system, which enables shorter acquisition times to be obtained and with a complexity lower than in prior art.

DISCLOSURE OF THE INVENTION

The present invention is defined by a method for acquiring a Gold sequence spreading a signal at a chip rate, said Gold sequence being obtained as a sum of a first M-sequence and a second M-sequence, the first M-sequence being generated by a first generator polynomial and the second M-sequence being generated by a second generator polynomial, the first and second generator polynomials being of the same degree and the weight of the second generator polynomial being higher than the weight of the first generator polynomial, the method comprising:

(a) a step of receiving and sampling at the chip rate said signal to obtain a plurality of samples representative of successive elements of said Gold sequence;

(b) a first step of message passing decoding in a first bipartite graph between first variable nodes representing the successive elements of the Gold sequence and first control nodes, each control node being bi-univocally associated with a variable representative of an element of the second M-sequence, the edges of the bipartite graph being determined by the coefficients of the first generator polynomial;

(c) a step of decimating the variables representative of successive elements of the second M-sequence using a predetermined decimation factor to obtain second variables representative of elements of a third M-sequence, the third sequence being of the same length as the second sequence and being generated by a third generator polynomial having a minimum weight;

(d) a second step of message passing decoding in a second bipartite graph between said second variable nodes and second control nodes, the edges of the second bipartite graph being determined by the coefficients of the third generator polynomial.

A plurality of first steps of message passing decoding can be carried out before carrying out said decimation step.

Advantageously, after the second step of message passing decoding, a reverse operation to that of the decimation step is carried out to update said variables representative of the successive elements of the second sequence.

A plurality of second steps of message passing decoding can also be carried out before carrying out a reverse operation to that of the decimation step.

Steps (b), (c), (d) can be iterated until a predetermined stopping criterion is fulfilled. When this stopping criterion is fulfilled, the generation moment of said Gold sequence is determined based on the values of the first variables representative of the elements of the Gold sequence and the variables representative of the successive elements of the second sequence.

BRIEF DESCRIPTION OF THE DRAWINGS

Further characteristics and advantages of the invention will appear upon reading preferential embodiments of the invention made with reference to the appended figures among which:

FIG. 2 gives parameters of Gold codes for different satellites;

DETAILED DISCLOSURE OF PARTICULAR EMBODIMENTS

It is reminded that a signal emitted by a satellite of a positioning system as the GPS system or Galileo system is obtained by spectrally spreading a navigation message, the spreading code being specific to the satellite in question. Each symbol of the message lasts a plurality of repetition periods of the spreading code. Thus, for the GPS system, each symbol lasts 20 ms, that is 20 repetition periods of the spreading code, the chip rate being 1,023 MHz.

The spreading sequences $c_i$ of the different satellites $i=1,\ldots,1$ are Gold sequences, each Gold sequence being built from a sum of two sequences having a maximum length, also called M-sequences. It is reminded that an M-sequence is a periodical series of values which is produced by a linear feedback shift register (LFSR) which explores all the values that can be produced by the shift register. Any linear combination of two M-sequences having the same degree r (that is generated by generator polynomials having the same degree) does not necessarily yield a Gold sequence: a pair of M-sequences the sum of which yields a Gold sequence is called a pair of preferential sequences.

The spreading sequences $c_i$ are each built from a pair of preferential M-sequences, x and y. More precisely:

$$c_i(k)=x(k)+y(k-\tau_i) \quad (1)$$

where $\tau_i$ is a delay, expressed in number of chip periods, specific to the satellite i.

In the case of the GPS system, the M-sequences x and y are respectively generated from the generator polynomials:

$$g_x(D)=D^{10}+D^3+1$$

$$g_y(D)=D^{10}+D^9+D^8+D^3+D^2+1 \quad (2)$$

Figure 1:
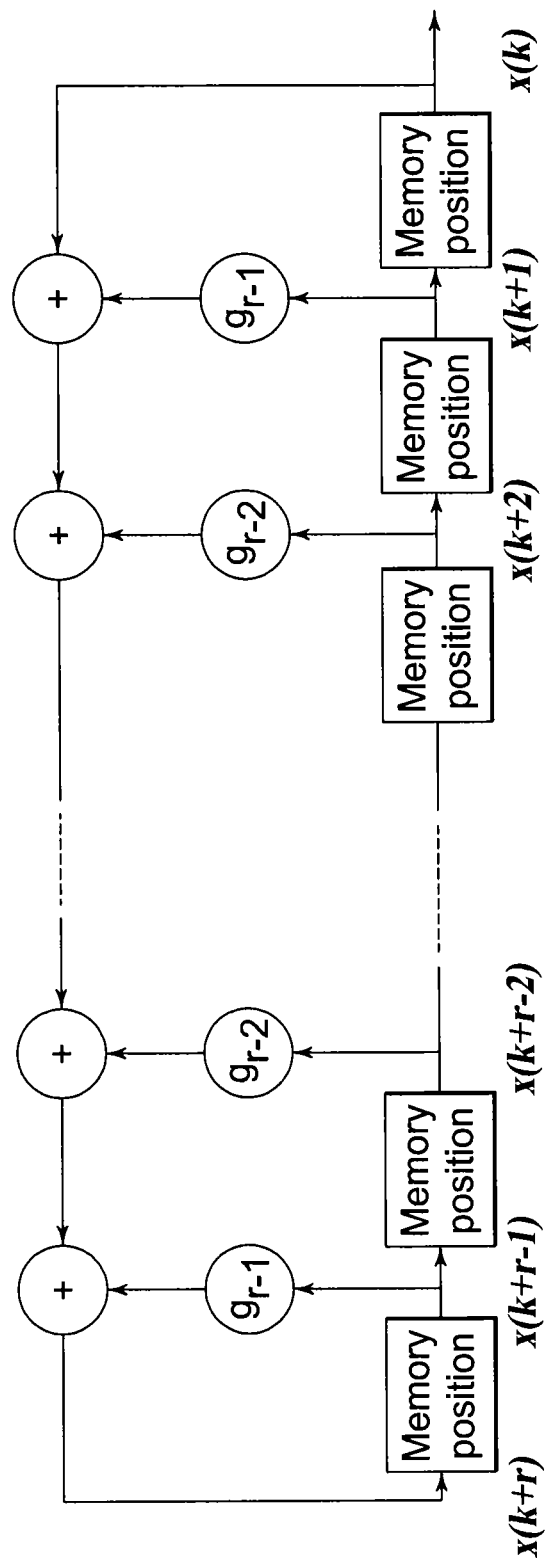
FIG. 1 schematically represents a maximum sequence generator according to a Fibonacci representation.

It is reminded that an LFSR sequence generated by a generator polynomial $$g(D) = \sum_{p=0}^{r} g_p D^p$$

having a degree r, with $g_r=g_0=1$ is obtained by a shift register having r memory positions (more simply called positions hereinafter) and r samples, looped back on itself, as represented in FIG. 1, according to the so-called Fibonacci representation. The multipliers on the different samples are the coefficients of the generator polynomial.

An M-sequence is univocally defined by its generator polynomial, the content of the shift register at the initial moment giving its value at the origin. An M-sequence generated by a (primitive) generator polynomial having a degree r is periodical and of a length $K=2^r-1$. The M-sequences x and y are generated by setting the positions of their respective shift registers to 1, that is $x(0)=x(1)=\ldots=x(9)=1$ and $y(0)=y(1)=\ldots=y(9)=1$.

It can be shown that the Gold sequence $c_i$ is also an M-sequence having a length $2^{2r}-1$ and a generator polynomial $g_c(D)=g_x(D)g_y(D)$.

The delayed sequence defined by $y_i(k)=y(k-\tau)$ is advantageously obtained using the "add and shift" property of the M-sequences. More precisely, the delays $\tau_i$ are selected such that the sequence $y_i$ can be generated from the sum of the contents at two positions $\alpha_i$ and $\beta_i$ of the shift register generating the sequence y, that is:

$$y_i(k)=a_{\alpha_i}(k)+a_{\beta_i}(k) \quad (3)$$

where $\alpha_{\alpha_i}(k)$, $\alpha_{\beta_i}(k)$, are the contents of the shift register at the positions $\alpha_i$ and $\beta_i$ respectively, at the moment k, in other words $\alpha_{\alpha_i}(k)=y(k+\alpha_i)$ and $\alpha_{\beta_i}(k)=y(k+\beta_i)$.

It has been represented in FIG. 2 a table giving the parameters $\alpha_i$, $\beta_i$ and $\tau_i$ for the different satellites. More precisely, the column entitled "code phase selection" gives the positions $\alpha_i$, $\beta_i$ and the column entitled "code delay chips" gives the delay $\tau_i$. Finally, the last column provides the setting word, that is the first 10 values of the sequence $y_i$ in octal representation.

Figure 3:
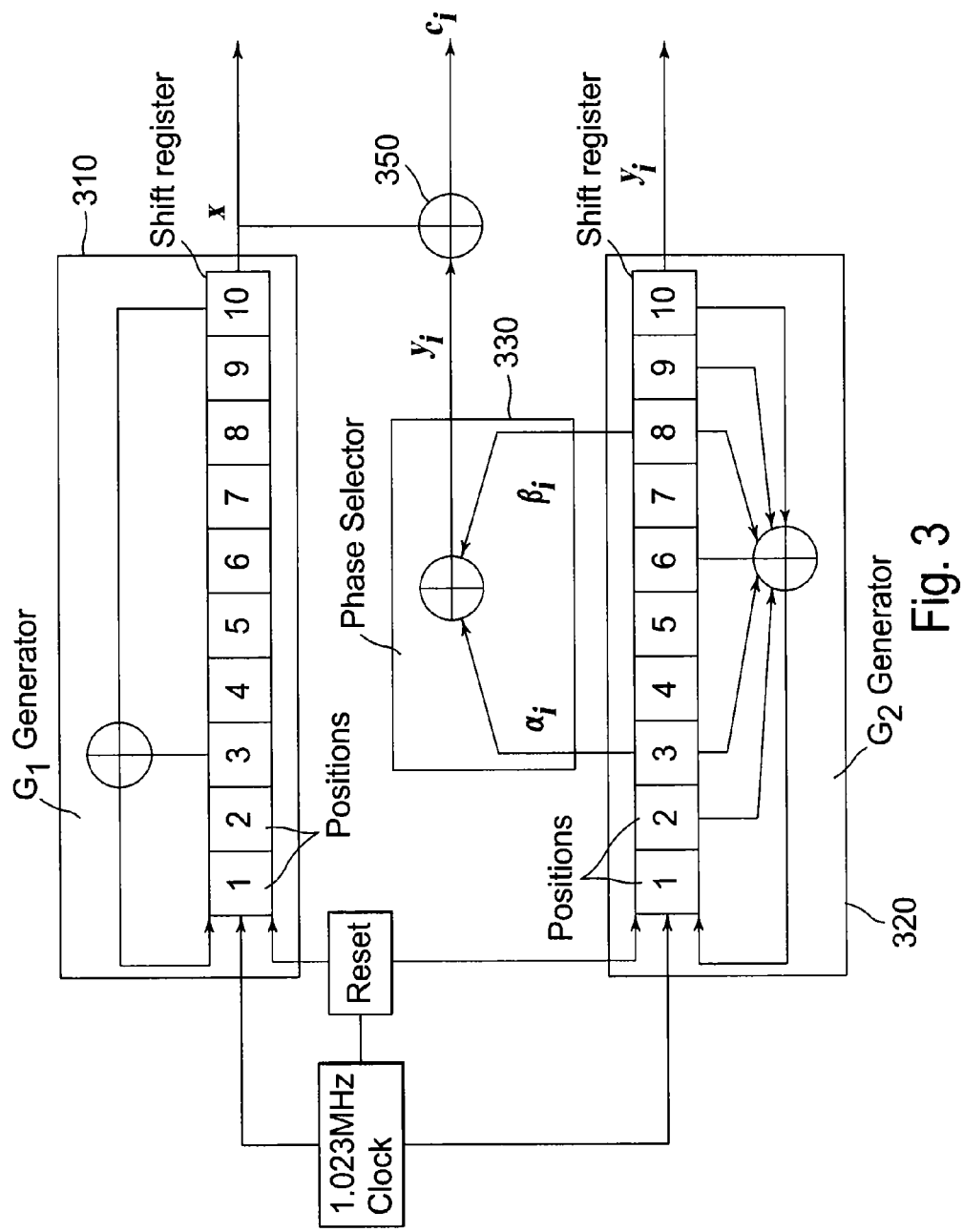
FIG. 3 schematically represents a Gold code generator in a GPS system.

FIG. 3 schematically represents a spreading code (C/A code) generator in a GPS system.

In the upper part, the generator 310 of the M-sequence x is distinguished and in the lower part, the generator 320 of the M-sequence y is distinguished. Both generators 310 and 320 use shift registers looped back on themselves. For each generator, the samples of the shift register correspond to the monomials of the corresponding generator polynomial. The phase selector 330 selectively sums some positions of the shift register 320. The choice of these positions $\alpha_i$ and $\beta_i$ is carried out according to the table of FIG. 2, the sum of the contents of the register at these two positions providing the delayed sequence $y_i$. This implementation is advantageous given that it does not require the use of a significant delay line, having the length $\tau_i$.

The sum of the M-sequences x and $y_i$ in 350 yields the Gold sequence $c_i$, in other words the spreading sequence relating to the satellite i.

In what follows, the synchronization of a receiver with respect to a signal of a satellite i will be considered, in other words the acquisition of a satellite signal emitted by the satellite i.

The receiver samples at the chip rate the satellite signal received, after translation in baseband.

The receiver forms a sequence of N successive samples of the signal thus received, where $N>2r$. These N successive samples consist of flexible values, for example Log Likelihood Ratios (LLR) and will be noted $r(0), \ldots, r(N-1)$ in what follows.

The samples $r(k)$, $k=0, \ldots, N-1$, can be expressed in the form:

$$r(k)=\tilde{x}(k)\tilde{y}(k-\tau_i)+w(k) \quad (4)$$

where $\tilde{x}(k)=1-2x(k)$ and $\tilde{y}(k)=1-2y(k)$ are the BPSK versions of the bits $x(k)$ and $y(k)$.

The sequences x et y, respectively fulfil the parity equations:

$$\sum_{j=0}^{r} g_x(r-j)x(k+j) = 0 \quad (5\text{-}1)$$

$$\sum_{j=0}^{r} g_y(r-j)y_i(k+j) = 0 \quad (5\text{-}2)$$

the sums herein relating to bits and being thus modulo 2 calculated.

In a similar way, the Gold sequence $c_i$ formed by the M-sequences x and $y_i$ fulfils the parity relationship:

$$\sum_{k=0}^{2r} g_c(2r-k)c_i(k) = 0 \quad (6)$$

Given that $c_i(k)=x(k)+y_i(k)$, $$\sum_{j=0}^{r} g_x(r-j)c_i(k+j) = \sum_{j=0}^{r} g_x(r-j)y_i(k+j) \quad (7)$$

In view of the aforesaid "add-and-shift" property of the M-sequences, there is an integer $\theta_i$ such that:

$$y_i(k+\theta_i) = \sum_{j=0}^{r} g_x(r-j)y_i(k+j) \quad (8)$$

In view of (7) and (8), there is the parity equation:

$$\left(\sum_{j=0}^{r} g_x(r-j)c_i(j+k)\right) + y_i(k+\theta_i) = 0 \quad (9)$$

Figure 4:
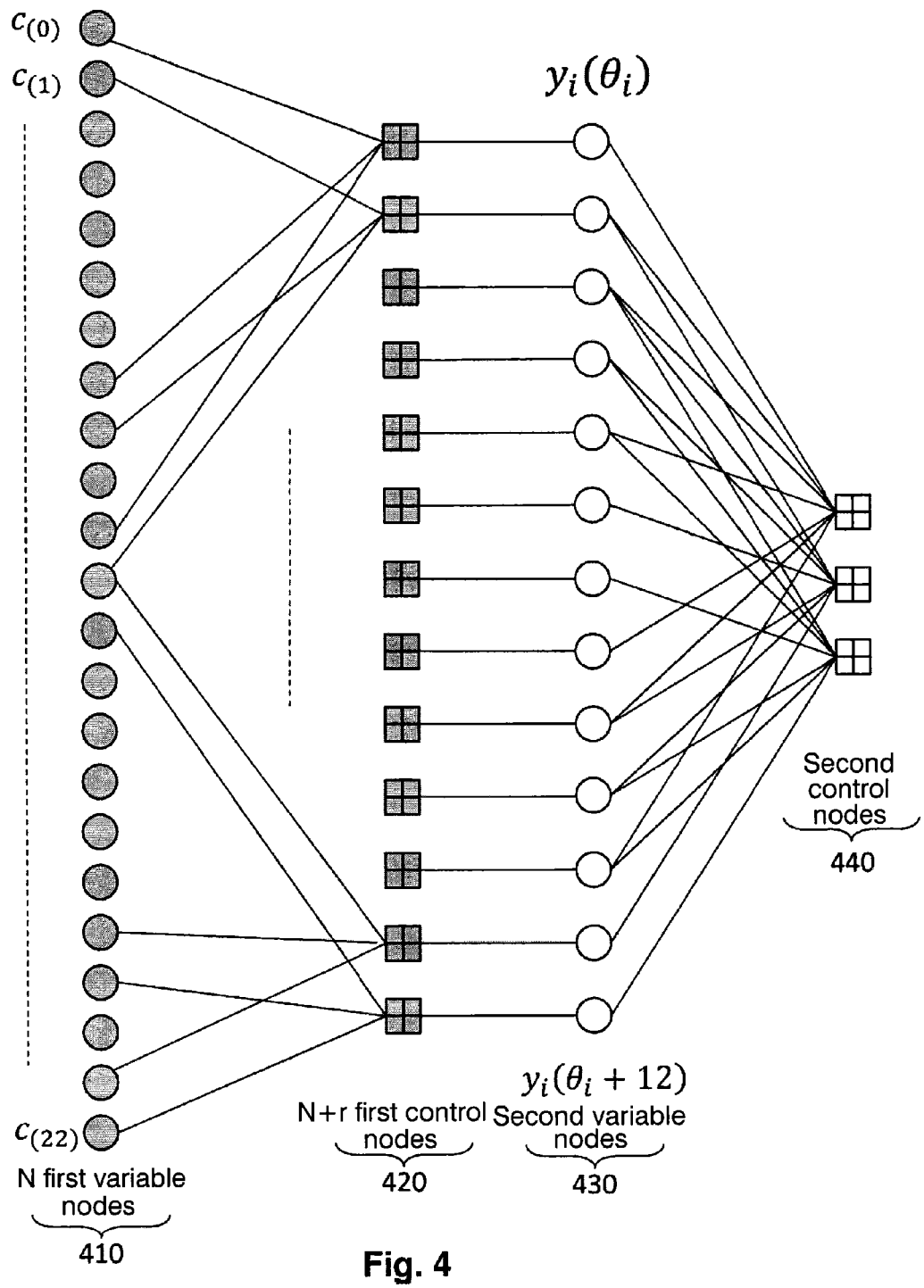
FIG. 4 schematically represents a method for acquiring a Gold sequence using two message passing cascaded decoders.

It is understood from the expressions (5-2) and (9) that the sequences $c_i(k)$ and $y_i(k)$ can be decoded together using two cascade message passing decoders, as represented in FIG. 4.

The first decoder is based on a first bipartite graph comprising N first variable nodes, 410, and N−r first control nodes, 420. The first variable nodes are set with the values of the samples r(0), . . . , r(N−1) and the first control nodes correspond to the parity equations (9). The edges of the first bipartite graph are determined by the coefficients of the generator polynomial $g_x$ and, more precisely, by the elements of the parity matrix having the size (N−r)×N:

$$H_x = \begin{pmatrix} g_x(r) & \ldots & g_x(0) & 0 & \ldots & \ldots & 0 \\ 0 & g_x(0) & \ldots & g_x(0) & 0 & \ldots & 0 \\ \vdots & \ddots & \ddots & \ddots & \ddots & \ddots & \vdots \\ 0 & \ldots & 0 & g_x(r) & \ldots & g_x(0) & 0 \\ 0 & \ldots & \ldots & 0 & g_x(r) & \ldots & g_x(0) \end{pmatrix} \quad (10)$$

each first control node corresponding to a row of the parity matrix $H_x$.

A second variable node is bi-univocally associated with each of the first control nodes 420. More precisely, a second variable node $y_i(k+\theta_i)$ is associated with each first control node k=0, . . . , N−r−1, corresponding to the parity equation (9-2).

The second decoder is based on a second bipartite graph comprising N−r second variable nodes, 430, and N−2r second control nodes, 440. The second variable nodes are set at null values of LLR (absence of a priori information) and the second control nodes correspond to the parity equations (5-2). The edges of the second bipartite graph are determined by the coefficients of the generator polynomial $g_y$ and, more precisely, by the elements of the parity matrix having the size (N−2r)×(N−r):

$$H_y = \begin{pmatrix} g_y(r) & \ldots & g_y(0) & 0 & \ldots & \ldots & 0 \\ 0 & g_y(0) & \ldots & g_y(0) & 0 & \ldots & 0 \\ \vdots & \ddots & \ddots & \ddots & \ddots & \ddots & \vdots \\ 0 & \ldots & 0 & g_y(r) & \ldots & g_y(0) & 0 \\ 0 & \ldots & \ldots & 0 & g_y(r) & \ldots & g_y(0) \end{pmatrix} \quad (11)$$

each second control node corresponding to a row of the parity matrix $H_y$.

The first message passing decoder enables a first estimation of the variables $c_i(k)$, k=0, . . . , N−1 and $y_i(k+\theta_i)$, k=0, . . . , N−r−1 to be obtained. The second message passing decoder then enables the first estimation of the variables $y_i(k+\theta_i)$, k=0, . . . , N−r−1 to be refined using requirements imposed by the control nodes 540. This refined second estimation is then used in the first decoder to refine the first estimation of the variables $c_i(k)$, k=0, . . . , N−1 and $y_i(k+\theta_i)$, k=0, . . . , N−r−1. The decoding process is thus continued until a stopping criterion is fulfilled, for example after a predetermined number of iterations or when the LLR absolute values of the variables $c_i(k)$, k=0, . . . , N−1 are higher than a predetermined threshold. Other stopping criteria can be contemplated by those skilled in the art without departing from the scope of the present invention.

Passing from the first to the second decoder can be carried out every $L_1 \geq 1$ iterations of the first decoder. In a similar way, passing from the second to the first decoder can be carried out every $L_2 \geq 1$ iterations of the second decoder. It is reminded that an iteration of a message passing decoder comprises a first message transfer from the variable nodes to the control nodes via the bipartite graph and a second message transfer in the reverse direction.

Figure 5:
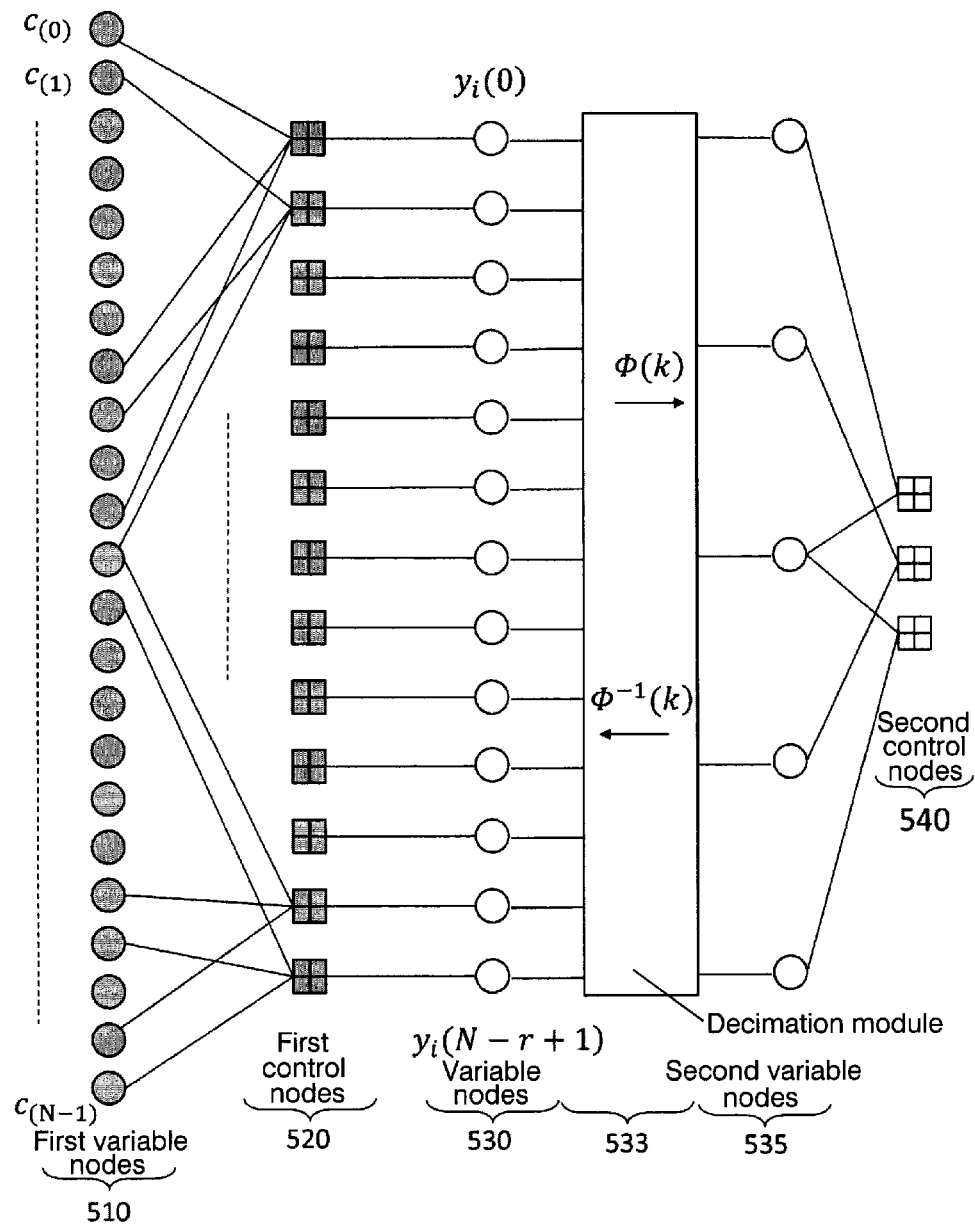
FIG. 5 schematically represents a method for acquiring a Gold sequence according to an embodiment of the invention.

FIG. 5 schematically represents a method for acquiring a Gold sequence according to one embodiment of the invention.

It is assumed as previously that the Gold sequence $c_i$ to be acquired is the sum of a first M-sequence x with a generator polynomial $g_x$ and a second M-sequence $y_i$ with a generator polynomial $g_y$. It will be assumed that both generator polynomials $g_x$ and $g_y$ are of the same degree and that the weight of the polynomial $g_y$ is higher than the weight of the polynomial $g_x$. It is reminded that the weight of a polynomial is the sum of the coefficients of the monomials located in this polynomial. Thus, the respective weights of the polynomials $g_x$ and $g_y$ defined in (2) are respectively 3 and 7.

It is known that two M-sequences having the same size, that is whose generator polynomials have the same degree, are related by a decimation relationship. In other words, for two M-sequences $z_1$ and $z_2$ having the respective generator polynomials $g_{z1}$ and $g_{z2}$, of the same degree r, there is a decimation factor $\eta_{21}$ and an offset $\mu_{21}K$ such that:

$$z_2(k) = z_1(\eta_{21}k + \mu_{21}) \quad (12)$$

where, of course, the values of k and $\eta_{21}k$ are taken modulo $K=2^r-1$.

For the same reason, there is a decimation factor $\eta_{12}$ and an offset $\eta_{12}<K$ such that:

$$z_i(k)=z_2(\eta_{12}k+\mu_{12}) \quad (13)$$

the decimation factors $\eta_{21}$ and $\eta_{12}$ fulfilling:

$$\eta_{21}\eta_{12}=1 \text{ modulo } K \quad (14)$$

and besides, the offset $\mu_{21}$ and $\mu_{12}$ fulfilling:

$$\eta_{12}\mu_{21}+\mu_{12}=0 \text{ modulo } K \quad (15\text{-}1)$$

and $$\eta_{12}\mu_{12}+\mu_{21}=0 \text{ modulo } K \quad (15\text{-}2)$$

If the M-sequence $y_i$ with the generator polynomial $g_y$ is considered, there is a polynomial $g_u$ of the same degree r, and of a lower weight, generating an M-sequence u such that:

$$u(k)=y_i(\Phi_i(k)) \quad (16)$$

with $\Phi_i(k)=\eta k+\mu_i$ where i is a decimation factor and pi is an offset depending on $\theta_i$.

Resorting to a generator polynomial $g_u$ of a minimum weight in lieu of a generator polynomial $g_y$ results in a bipartite graph of the second decoder having little or no short circles, which speeds up decoding convergence and reduces the error rate.

More precisely, FIG. 5 shows a first message passing decoder the variable nodes 510 of which correspond to the successive bits of the Gold sequence to be acquired and the control nodes 520 of which are set by the LLR values of the samples of the signal received, after translation to a baseband. As previously, each first control node is associated with a given requirement by a row of the matrix $H_x$ and at a variable node $y_i(k+\theta_i)$, $k=0, \ldots, N-r-1$.

Unlike FIG. 4 however, a decimation of the variables $y_i(k+\theta_i)$, $k=0, \ldots, N-r-1$ is then carried out to obtain an M-sequence u corresponding to the generator polynomial with a minimum weight $g_u$. The second message passing decoding is carried out from the sequence decimated by the decimation factor $\eta$. More precisely, the second decoding is achieved by messages passing on a second bipartite graph comprising second variable nodes 535 and second control nodes 540, the second variables being obtained by decimation of the variables $y_i(k+\theta_i)$, $k=0, \ldots, N-r-1$.

The edges of the second bipartite graph of the second message passing decoder are determined by the coefficients of the generator polynomial having the minimum weight $g_u$ and more precisely by the elements of the parity matrix with the size $(N-2r)\times(N-r)$:

$$H_u = \begin{pmatrix} g_u(r) & \cdots & g_u(0) & 0 & \cdots & \cdots & 0 \\ 0 & g_u(0) & \cdots & g_u(0) & 0 & \cdots & 0 \\ \vdots & \ddots & \ddots & \ddots & \ddots & \ddots & \vdots \\ 0 & \cdots & 0 & g_u(r) & \cdots & g_u(0) & 0 \\ 0 & \cdots & \cdots & 0 & g_u(r) & \cdots & g_u(0) \end{pmatrix} \quad (17)$$

This parity matrix has the advantage of being more sparse (sparse matrix) than the parity matrix $H_y$ and, consequently, the cycles of the second bipartite graph of the second decoder are longer.

It will be noted that the second decoder is separated from the first decoder by a decimation module 533. This module carries out a decimation $\Phi_i(k)=\eta k+\mu_i$ when the sequence $y_i$ is switched to the sequence u, in other words when an iteration of the first decoder is switched to an iteration of the second decoder. Conversely, this module carries out an operation in the reverse direction, that is a decimation $\Phi_i^{-1}(k)=\eta'k+\mu_i'$ when the sequence u is switched to the sequence $y_i$, in other words when an iteration of the second decoder is switched to an iteration of the first decoder. In order to allow this decimation operation to switch from the sequence u to the sequence $y_i$ and conversely, the number of samples of these sequences must be greater than or equal to $K=2^r-1$, in other words the number N of samples of the signal received must be such that $N \geq 2^r+r-1$. Preferably, $N=2^r+r-1$ can be chosen.

In the case of a satellite reception, the decoding can be repeated for each satellite i. When the decoding converges, the sequences $c_i(k)$ and $y_i(k+\theta_i)$ are obtained. Then, it is possible to deduce where it is in the M-sequences $y_i(k+\theta_i)$ and $x(k)$, in other words the generation moment of the Gold sequence, and to be synchronized with respect to the same.

Figure 6:
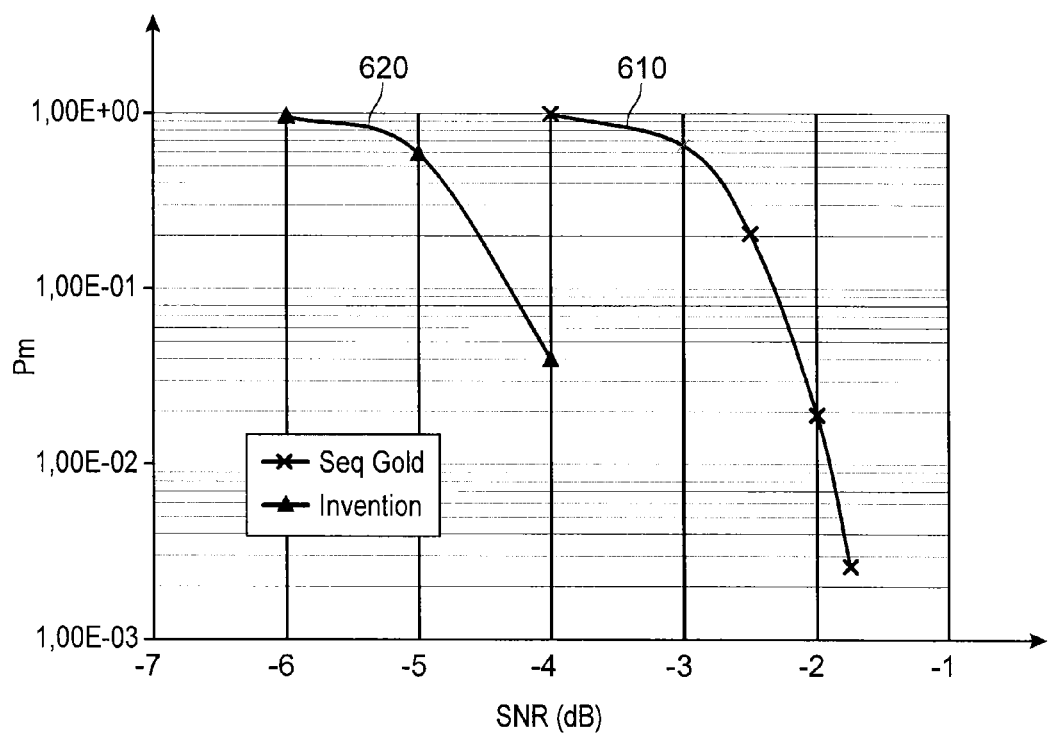
FIG. 6 illustrates the probability of acquiring a Gold sequence as a function of the signal-to-noise ratio, for the acquisition method of FIG. 5 and that of FIG. 4.

FIG. 6 illustrates the probability of acquiring a Gold sequence as a function of the signal-to-noise ratio, according to the decoding method of FIG. 5 and that of FIG. 4.

In 610, the probability of acquiring the Gold sequence obtained using the method illustrated in FIG. 4 has been represented and, in 620, the one obtained using the method according to one embodiment of the invention, illustrated in FIG. 5 has been represented.

The generator polynomials used were the following ones:

$$g_x(D)=D^{10}+D^3+1$$

$$g_y(D)=D^{10}+D^9+D^8+D^6+D^3+D^2+1$$

$$g_r(D)=D^{30}+D^{19}+D^{18}+D^{16}+D^{11}+D^8+D^5+D^2+1$$

$$g_u(D)=g_x(D)$$

and the decimation function was $\Phi(k)=65k+27300$.

It is noted that the acquiring method of FIG. 5 gains about 2 dB in signal-to-noise ratio for a same acquisition probability.

The invention claimed is:

1. A method for acquiring a Gold sequence ($c_i$) spreading a signal at a chip rate, said Gold sequence being obtained as a sum of a first M-sequence (x) and a second M-sequence ($y_i$), the first M-sequence being generated by a first generator polynomial ($g_x$) and the second M-sequence being generated by a second generator polynomial ($g_y$), the first and second generator polynomials being of the same degree and a weight of the second generator polynomial exceeds a weight of the first generator polynomial, the method comprising:

(a) a step of receiving and sampling at the chip rate said signal to obtain a plurality of samples representative of successive elements of said Gold sequence;

(b) a first step of message passing decoding in a first bipartite graph between first variable nodes representing the successive elements of the Gold sequence and first control nodes, each control node being bi-univocally associated with a variable representative of an element of the second M-sequence, edges of the first bipartite graph being determined by coefficients of the first generator polynomial;

(c) a step of decimating the variables representative of successive elements of the second M-sequence using a predetermined decimation factor to obtain second variables representative of elements of a third M-sequence, the third sequence (u) being of the same length as the second sequence and being generated by a third generator polynomial having a minimum weight ($g_u$);

(d) a second step of message passing decoding in a second bipartite graph between said second variable nodes and second control nodes, edges of the second bipartite graph being determined by coefficients of the third generator polynomial.

2. The method for acquiring the Gold sequence according to claim 1, wherein a plurality ($L_1$) of first message passing decoding steps are carried out before carrying out said decimation step.

3. The method for acquiring the Gold sequence according to claim 1 or 2, wherein after the second step of message passing decoding, a reverse operation to that of the decimation step is carried out to update said variables representative of the successive elements of the second sequence.

4. The method for acquiring the Gold sequence according to claim 3, wherein a plurality ($L_2$) of second message passing decoding steps are carried out before carrying out the reverse operation to that of the decimation step.

5. The method for acquiring the Gold sequence according to claim 1, wherein steps (b), (c), (d) are iterated until a predetermined stopping criterion is fulfilled.

6. The method for acquiring the Gold sequence according to claim 5, wherein, when the stopping criterion is fulfilled, a generation moment of said Gold sequence is determined based on values of the first variables representative of the elements of the Gold sequence and the variables representative of the successive elements of the second sequence.

* * * * *